Feb. 29, 1944. W. M. POLSON 2,342,889
GRINDING MACHINE
Filed Sept. 19, 1942 4 Sheets-Sheet 1
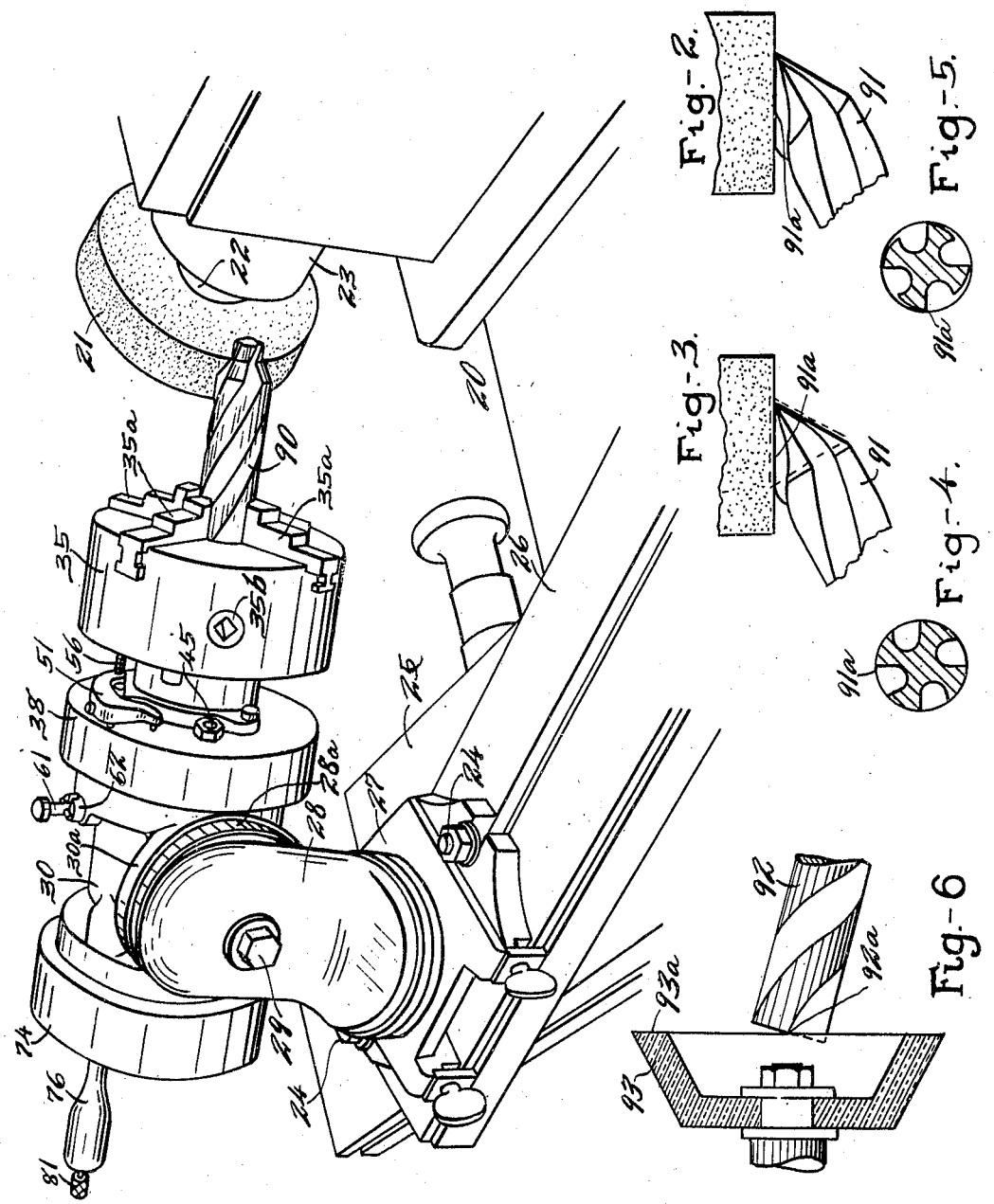
Inventor:
WILLIAM M. POLSON
By Chas. C. Reif
Attorney Feb. 29, 1944.    W. M. POLSON    2,342,889
GRINDING MACHINE
Filed Sept. 19, 1942    4 Sheets-Sheet 2
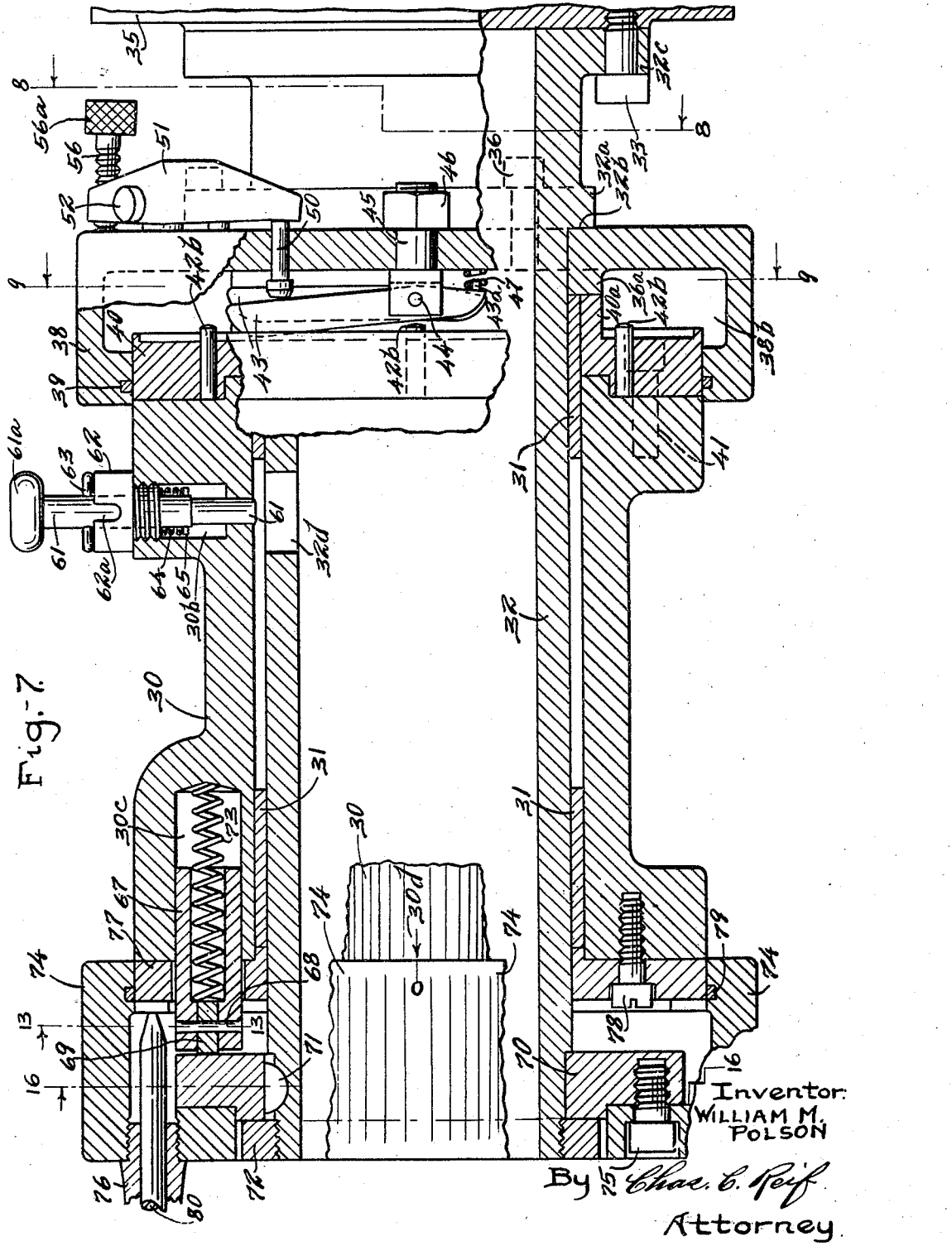

Feb. 29, 1944. W. M. POLSON 2,342,889
GRINDING MACHINE
Filed Sept. 19, 1942 4 Sheets-Sheet 3

Inventor:
WILLIAM M. POLSON
By Chas. C. Reif
Attorney.

Feb. 29, 1944. W. M. POLSON 2,342,889
GRINDING MACHINE
Filed Sept. 19, 1942 4 Sheets-Sheet 4
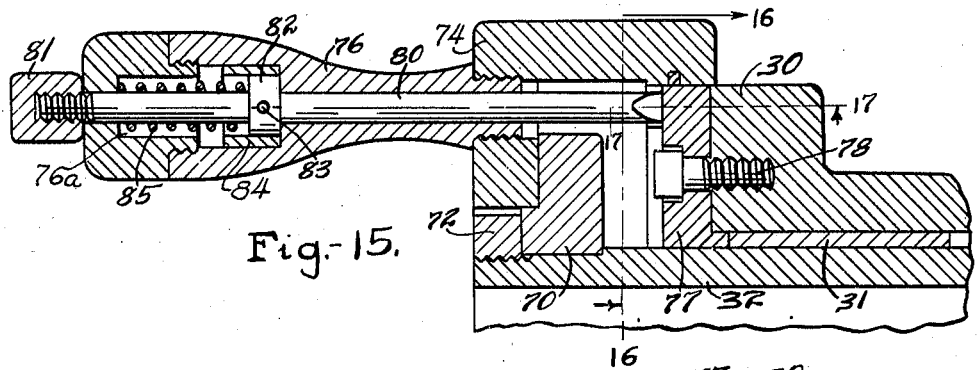
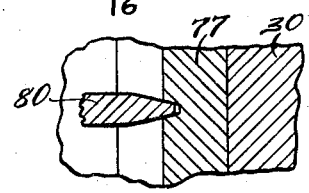
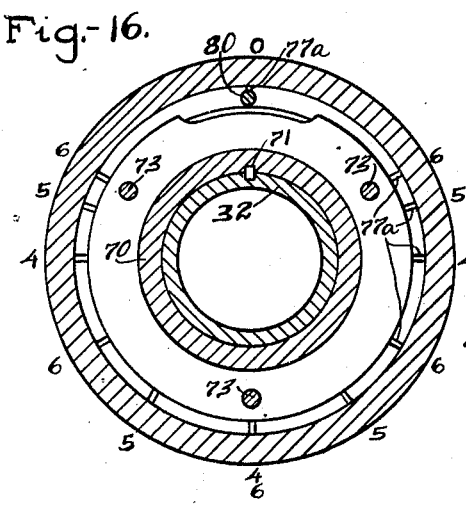
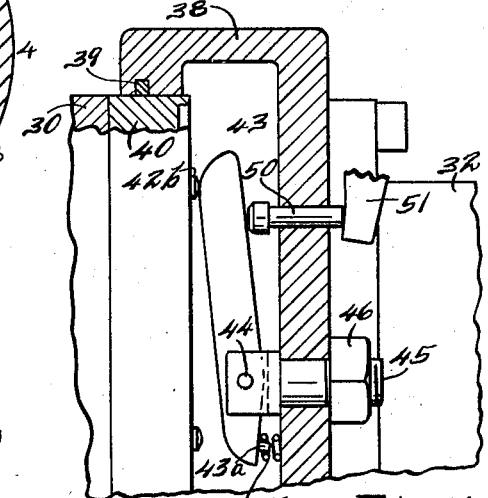
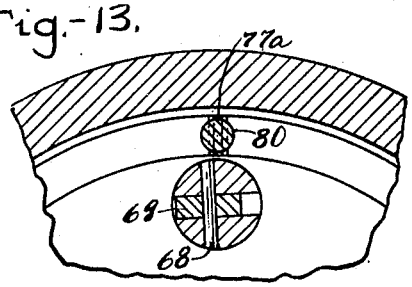
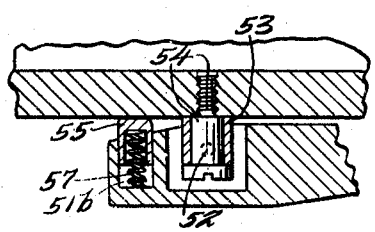
Inventor:
WILLIAM M. POLSON
By *Chas. C. Reif.*
Attorney.

Patented Feb. 29, 1944

2,342,889

UNITED STATES PATENT OFFICE 2,342,889

GRINDING MACHINE

William M. Polson, Minneapolis, Minn.

Application September 19, 1942, Serial No. 458,943

9 Claims. (Cl. 51—219)

This invention relates to a grinding machine and particularly to a machine for forming radial clearance on a cutting tool, particularly a tool having flutes therein.

Such tools as drills, reamers, taps and other chamfered tools are now commonly made with grooves or flutes therein and these grooves or flutes are commonly formed to extend helically about said tool. Said tools have a tapered or pointed portion at their ends and the cutting edge of the tool extends along this portion at one side of a flute. It is desirable to have radial clearance sometimes called radial backoff, on the tool extending from the cutting edge opposite the direction of rotation of the tool. This clearance is formed by progressively reducing the diameter of the surface of the tool as it recedes from the cutting edge. This formation of the radial clearance or radial backoff has heretofore been done by hand and was a long and tedious task and it was difficult to get uniform radial clearance on all of the cutting edges.

It is an object of this invention to provide a machine for quickly, effectively and very accurately forming the radial clearance or radial backoff on cutting tools, particularly tools of the fluted type.

It is a further object of the invention to provide a machine for forming a radial clearance or radial cutoff at the cutting end of the tool comprising a holding means for the tool adapted to be positioned to bring a tool in proper relation to the grinding surface of a grinding means together with means for progressively moving the tool toward said grinding surface as said tool rotates in engagement with said grinding surface from the cutting edge rearwardly.

It is a further object of the invention to provide a device for forming radial clearance or radial backoff on a tool, particularly a tool of the fluted type comprising a holding means for said tool, a plurality of cams normally held in inoperative position, a plurality of series of members arranged respectively in alignment with said cams, the members in said series being differently spaced, means for selectively moving one of said cams into operative position and means for rotating said holding means with said tool engaging the grinding surface of said grinding means whereby said tool will be progressively moved toward said grinding surface as one of the members of said series engages with said cam and means for retracting said holding means and tool when none of said members is in engagement with said cam.

These and other objects and advantages of the invention will be fully set forth in the following description made in connection with the accompanying drawings in which like reference characters refer to similar parts throughout the several views and in which:

Fig. 1 is a diagonal view of the machine;

Fig. 2 is a horizontal section through the grinding means showing the tool in engagement therewith;

Fig. 3 is a view similar to Fig. 2 indicating how the tool moves toward the grinding means;

Fig. 4 is a transverse section of a tool before the radial clearance is formed thereon;

Fig. 5 is a view similar to Fig. 4 showing the tool with the radial clearance formed thereon;

Fig. 6 is a diagonal view illustrating an operation on a different sort of tool;

Fig. 7 is a view partly in central vertical section and partly in side elevation of a portion of said machine;

Fig. 12 is a section taken as indicated by line 12—12 of Fig. 8;

Fig. 13 is a section taken as indicated by line 13—13 of Fig. 7;

Fig. 14 is a partial sectional view similar to Fig. 7;

Fig. 15 is a radial section through the operating handle for the device and adjacent parts;

Fig. 16 is a vertical section taken substantially on line 16—16 of Fig. 15 as indicated by the arrow; and Fig. 17 is a horizontal section taken on line 17—17 of Fig. 15 as indicated by the arrow.

Figures 8, 10:
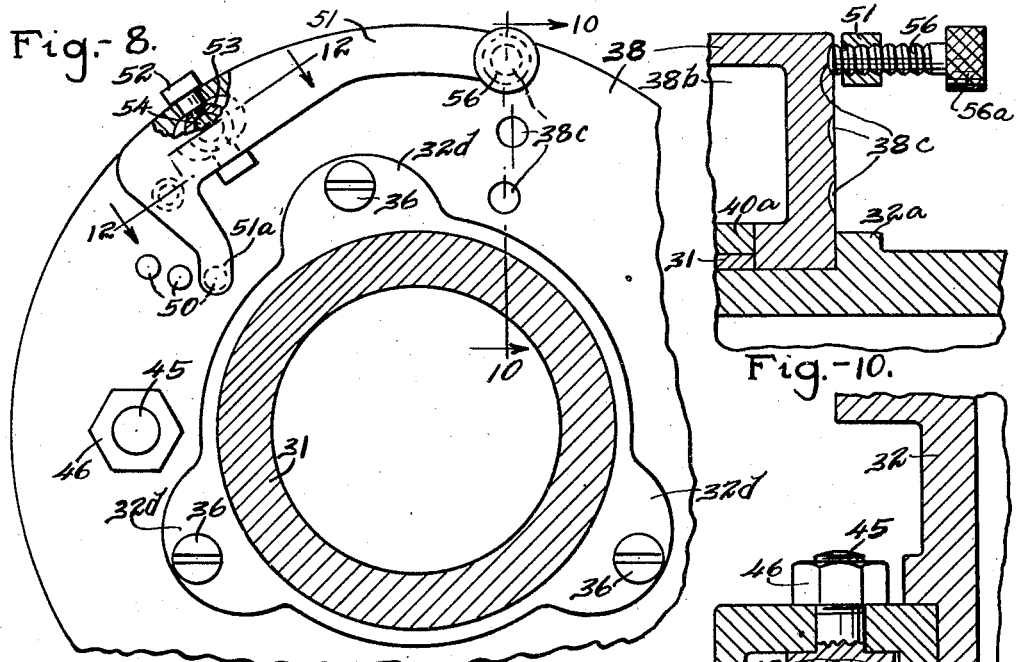
Fig. 8 is a view in elevation and section taken substantially as indicated by line 8—8 of Fig. 7 as indicated by the arrows.
Fig. 10 is a section as indicated on line 10—10 of Fig. 8 as indicated by the arrows.
Figures 9, 11:
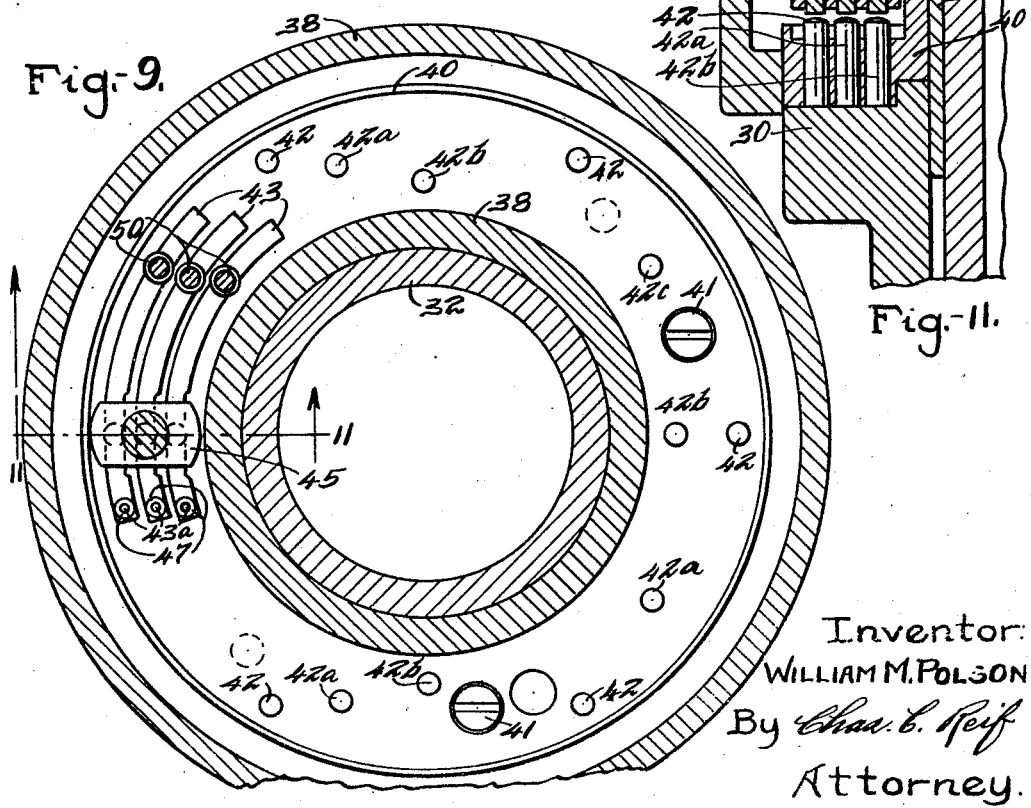
Fig. 9 is a section taken as indicated in line 9—9 of Fig. 7 as indicated by the arrows.
Fig. 11 is a section taken on line 11—11 of Fig. 9 as indicated by the arrows.

Referring to the drawings a machine is shown comprising a bed or table 20 on one end of which is arranged a grinding means shown as a cylindrical wheel 21 carried on a shaft 22 which rotates in a suitable bearing 23 and which will be provided with any suitable means for driving or rotating wheel 21 at high speed. Also shown on table or bed 20 is a plate 25 on which is mounted for oscillation a slide 26. A base member 27 is mounted for rotation and for movement longitudinally of slide 26 and has rising therefrom a rotatable head 28. Member 27 has locking studs and nuts 24 for locking it rigidly in position. Head 28 is provided with a boss 28a having a face disposed at right angles to the top surface of boss member 27 and a stud 29 extends centrally through said boss and forms a securing means for a casting 30 having a boss or hub 30a engaging and connected to boss 28a so that casting 30 is rotatable or oscillatable about the axis of stud 29 and may also be locked rigidly in position by said stud. Casting 30 is suitably bored and carries bushings 31 in which is rotatable a member 32 in the form of a hollow cylinder, said member 32 having a collar 32a adjacent its front and forming an offset or shoulder portion 32b and member 32 is also provided with an end flange 32c having an outer face at right angles to the central axis thereof. Secured to the flange 32c by circumferentially spaced headed and nutted bolts 33 is a chuck having a cylindrical body 35. This chuck is of the well known commercial form and comprises a plurality of radially extending jaws 35a movable in slots formed in the main body 35. Jaws 35a are provided with teeth within the body 35 and these teeth are engaged by helical threads or ribs on a ring rotatable in head 35. Said ring is rotated by a pinion secured to a shaft 35b which is provided with a socket for receiving a suitable implement for rotating the same. The parts described as on the interior of head 35 are not shown and since the chuck per se is now of commerce and specifically forms no part of the present invention, it is believed further illustration of said chuck is not necessary. Secured to member 32 by the headed screws 36 which pass through lugs 32d formed on collar 32a is a head 38. Head 38 is cylindrical in form and has a portion engaging the periphery of member 32 and engaging shoulder 32b. Head 38 also has a portion bored to extend slightly over the cylindrical front end of casting 30 and over a member 40 secured thereto. Member 40 has an outer diameter the same as said front end of casting 30 and is generally in the form of a flat cylindrical plate, the same being secured to casting 30 by spaced headed screws 41 having their heads countersunk in member 40. Member 38 is arranged to rotate on casting 30 and member 40. A gasket 39 is shown in member 38 disposed to engage the periphery of member 40. Member 40 has a hub 40a surrounding the front end of one of the bushings 31 and member 38 has an interior hub 38a shown as the same diameter as hub 40a. Member 38 has an annular chamber 38b therein and member 40 has secured therein a plurality of series of pins 42, 42a and 42b, the ends of which project into chamber 38b. Said pins are circumferentially spaced and the pins in the respective series are spaced a different distance radially from the center of member 32. The outer series of pins 42 are six in number, the center series of pins 42a are five in number and the inner series of pins 42b are four in number. Arranged in radial alignment with each series of pins is a cam member 43. Cam members 43 are curved concentrically to the axis of member 32 and are mounted intermediate their ends on a pin 44 extending through the block-like end of a stud 45 which passes through the front end of member 38 and is equipped with a suitable nut 46. Each cam 43 at one end is provided with a pin 43a which is received in one end of a coiled compression spring 47, the other end of which engages the inner side of member 38. The springs therefore, act to raise the short ends of cams 43 or move them away from member 38 and to move the long ends of the cams toward member 38. The normal position of the cams 43 is shown in Fig. 7, in which position the top and bottom of the cam are substantially parallel to the inner surface of member 38 and the outer surface of member 40. Arranged respectively to engage the longer ends of cams 43 are headed pins 50 which pins are slidable in bores in the front end of member 38. These pins are limited in their outward movement by the heads thereon and are limited in their inward movement by engagement with said cams 43. Mounted on the outer front face of member 38 is a lever 51. This lever is mounted for oscillation about an axis parallel to the front surface of member 38 and swings about the intermediate cylindrical portions of a pair of axially aligned headed studs 52 which extend therethrough and have inner ends threaded into a sleeve 53 which is disposed in a slot of elliptical form in lever 51 and is secured to member 38 by a headed stud 54, which stud has a cylindrical intermediate portion disposed in sleeve 53. (See Fig. 12.) Lever 51 has a bore 51b adjacent its pivot in which is slidably disposed a sleeve 55, one end of which engages the front surface of member 38. A coiled compression spring 57 has one end disposed in a bore in sleeve 55 and its other end engaging the bottom of bore 51b and acts to urge lever 51 away from the front of member 38. Lever 51 is thus oscillatably mounted about the axes of studs 52. Lever 51 has a boss at one end in which is threaded a screw 56 having a knurled head 56a. Screw 56 has a rounded end and this end is adapted to be received in any one of a series of semi-spherical depressions or holes 38c formed in the outer face of member 38. At its other end lever 51 has an arm 51a adapted to be moved into alignment with the outer ends of any one of the pins 50. By turning screw 56 it will be seen that said screw will rest against member 38 in one of the depressions 38c and lever 51 will be moved outwardly on said screw, thus moving the end or arm 51a inwardly or toward member 38 to press one of the pins 50 inwardly and move one of the cams 43 toward member 40 against the tension of its spring 47. One of said cams 43 is shown moved inwardly by pin 50 in Fig. 7, and this inward position is the operative position of said inward cam.

Member 32 has a slot 32d in the bearing portion thereof and a pin 61 is carried in casting 30 at the top thereof and adapted to move into slot 32d to hold member 32 against rotation. Pin 61 moves in a bore in a stud 62 threaded into member 30, said stud having a head at the outer side of member 30 provided with a transverse slot 62a in which a pin 63 extending transversely through pin 61 is adapted to be disposed. Pin 61 is provided with a knob handle 61a. Pin 61 extends through a recess 30b in the top of casting 30 and a compression coiled spring 64 surrounds pin 61, bearing at its upper end against the end of stud 62 and at its lower end against a pin 65 extending transversely through pin 61, said spring acting to move pin 61 inwardly. As shown in Fig. 7, pin 61 is held out of slot 32d by pin 63 extending at right angles to the slot 62a and engaging the top of stud 62. It will be seen that pin 61 can be rotated so that pin 63 will enter slot 62a under the force of spring 64 and pin 61 will then move into slot 32d. Casting 30 has a plurality of bores or recesses 30c formed in the rear end thereof in which are slidable pins or studs 67, the same having extending therethrough adjacent their rear ends pins 68 on which are journalled small rollers 69. Rollers 69 engage the inner flat face of a collar 70 secured on member 32 by one or more keys 71. A collar 72 is also threaded on the rear end of member 32 and engages member 70, said latter member at its inner side engaging a shoulder formed on member 32. Pins 67 are bored at their inner ends and compression coiled springs 73 are disposed in said bores bearing at one end against the bottom thereof and bearing at their other ends against the bottoms of recesses 30c. It will be seen that springs 73 tend to move member 32 to the position shown in Fig. 7 with its hub 38a engaging the front end of hub 40a.

To rotate member 32 the same has secured thereto a cylinder member 74, the same having a flange 74a secured to collar 70 by circumferentially spaced headed screws 75 having their heads countersunk in said flange. A handle 76 has its end threaded into member 74 and projects therefrom. A collar 77 is secured to the end of casting 30 by circumferentially spaced headed screws 78 and member 74 is provided with a gasket 79 engaging the periphery of collar 77. Collar 77 on its outer face is provided with a plurality of radial slots 77a. A pin 80 is slidable through a bore in handle 76 and is chamfered or flattened at its inner end so as to be engaged in the various slots 77a. The slots 77a are arranged to form an indexing means and it will be seen that there are four of these slots at 90 degrees apart, there are five of them at 72 degrees apart and there are six of them at 60 degrees apart. The casting 30 at its top is provided with a mark 30d and the member 74 is provided with a zero aligned with the top or central slot and it is provided with other figures as indicated in Fig. 16, designating the slots or the number thereof in the circle. By starting with the zero slot aligned with the mark 30d and then turning the member 74 to align the numbers 4, 5 and 6 respectively with said mark, the head can be accurately turned through a quarter, a fifth or a sixth of a revolution. Pin 80 will move into the corresponding slot and hold the head in this position. This indexing means per se forms no essential part of the present invention. Pin 80 has a knob handle 81 with a knurled periphery threaded on its outer end and said pin extends through a recess 76a in handle 76 and has a collar 82 secured thereto in any suitable manner as by the pin 83. Collar 82 is slidable in a bushing 84 in recess 76a and a compression coiled spring 85 is disposed in said recess, the same bearing at one end against collar 82 and at its other end against recess 76a. It will be seen that spring 85 tends to move pin 80 inwardly so as to engage in one of the slots 77a. Handle 76 is made in two parts as shown in Fig. 15, for the purpose of assembling the members therein.

In operation, when it is desired to form the radial clearance on a tool such as shown in Figs. 4 and 5 said tool will be secured centrally in the chuck 35 as shown in Fig. 1. A tool 90 shown in Fig. 1 is a counterbore drill, while the tool 91 shown in Figs. 2 and 3, is merely a standard boring drill. The radial clearance is formed the same on both tools 90 and 91. The casting 30 is now positioned as shown in Fig. 1, so as to bring the tapered portion 90a of tool 90 which is the cutting portion, with its surface substantially parallel to the peripheral surface of the grinding wheel 21. This position of the tool is shown also in Fig. 2. It will be understood that slide 26 can be swung on the table 25 and that head 28 can be rotated as desired to so position the tool. It may be stated that parts 20 to 28 form standard parts of a standard machine. With the tool positioned as shown in Figs. 1 and 2, and with the center of the tool substantially at the same level as the center of wheel 21, the operator will now turn pin 61 so that it will engage member 32 and hold the same in stationary position. In this position the tool will now be adjusted so that the grinding wheel is engaging the cutting edge of the tool substantially at the point 91a. With the tool thus positioned the head 38 will be in position so that rotation thereof will move the tool progressively inwardly as it rotates. The cams 43 are now positioned to act at the proper time as tool 91 is rotated. The operator now moves lever 51 to bring the screw 56 with its end positioned in one of the openings 38c. The openenings selected will depend on whether the tool has 4, 5 or 6 flutes. The tool illustrated has four flutes and the lever is thus positioned in the outer hole 38c. The inner end 51a of lever 51 is then positioned over the inner pin 50. The operator now rotates screw 56 and this swings lever 51 about its fulcrum and moves end 51a inwardly to push the pin 50 engaged inwardly. Pin 50 acts on its cam 43 and said cam is pushed inwardly as shown in Fig. 7. The amount that lever 51 is moved will be determined by the rotation given screw 56 so that the desired amount of clearance or the desired amount of movement of the tool in the grinding operation can be nicely determined. With the proper cam 43 in operative position the operator now pulls pin 61 outwardly and turns the same so that it is held out of slot 32d as shown in Fig. 7. The pin 81 is also moved to position to be disengaged from slots 77a. This can be done by pulling the same outwardly and turning the same so that pin 83 will engage the outer end of bushing 84, said bushing being provided with a slot (not shown) similar to slot 62a. The grinding wheel 21 is now rotated and the operator merely rotates member 74 by means of handle 76. This of course, rotates member 32 and head 38. The cams 43 are rotated and the cam which has been moved outwardly to operative position will engage the pins 42b as it rotates. As the cam moves over each pin 42b the same is forced outwardly and it moves head 38 outwardly against the tension of springs 73, thus moving the chuck 35 and the tool outwardly and forcing the tool against the grinding wheel. The tool is moved progressively against the wheel as long as cam 43 is in engagement with each pin. When the cam 43 passes the pin springs 73 move head 38 back to the position shown in Fig. 7. At this time the flute on the tool is passing the grinding surface of the wheel. As the next cutting edge 91a reaches the grinding wheel the cam 43 engages the next pin 42b and the tool is progressively moved against the wheel during the action of the cam on that pin. This operation is repeated with each pin 42b and the four portions of the tool are thus ground to give the desired radial appearance or radial backoff. The radial clearance formed on each portion of the tool will be the same and the radial clearances or backoffs will thus be uniform in every respect. The operation can be performed quite rapidly and a perfectly ground tool is produced very quickly. Before the use of the machine the operation forming the radial clearance was done by hand and it took quite a while. Furthermore, it is almost impossible for an operator working by hand to get the clearance accurately the same on all four portions of the tool. If the tool has five flutes the lever 51 will be positioned in the middle hole 38c and pins 42a would then be engaged by the central cam 43. If the tool has six flutes lever 51 will be positioned in the inner hole 38c and pins 42 which are six in number, would be engaged by the outer cam 43. One desirable feature of the construction is that lever 51 can be positioned to act on only one cam. The other cams are moved by their springs 47 to inoperative position. Assurance is thus had that only one cam will be in operative position at one time. Lever 51 cannot move more than one cam at one time. It will be understood that lever 51 is constantly acted upon by spring 57 moving the end-carrying screw 56 inwardly so that screw 67 is held in the openings 38c.

By using the indicating means comprising pin 80 and the slots 77a above described, the machine can also be efficiently used to provide clearance on a flat nosed tool such as the flat nose or flat ended drill shown in Fig. 6. The casting 30 will be tilted so that the tool 92 will incline upwardly. The tool will then be brought with one of its cutting edges 92a engaging the front face 93a of the cup shaped wheel 93 substantially at the horizontal plane passing through the center of the wheel. The wheel 93 can now be operated and the tool 92 turned by turning member 74 by means of handle 76. Tool 92 shown has only two flutes and the member 74 and thus member 32 and the tool would be turned through 180 degrees. This would provide the clearance on one face of the tool. By turning the tool through another 180 degrees the clearance would be provided on the other face of the tool. This is just one method that can be performed by means of the present machine. The flat nosed tool has no tapered portion as do the tools 90 and 91 and this could not be ground as are such tools.

From the above description it will be seen that I have provided a simple, compact and very efficient machine for providing the radial clearance or radial backoff on various cutting tools. The machine can be used to provide such radial clearance or backoff on drills, taps, counterbore drills, reamers, boring bars and various types of chamfered tools. The radical back clearance or backoff can be very quickly and accurately made on the tools and made much more rapidly than has previously been done. The machine is comparatively simple and compact in operation and is very easily operated. The same has been amply demonstrated in actual practice and found to be very successful and efficient.

It will of course, be understood that various changes may be made in the form, details, arrangement and proportions of the parts without departing from the scope of applicant's invention, which generally stated, consists in a device capable of carrying out the objects above set forth, in the parts and combinations of parts disclosed and defined in the appended claims.

What is claimed is:

1. A device for forming radial clearance on a tool of the fluted type adapted to be used with a grinding means having in combination, a head, means on said head for holding said tool, means for rotating said head, a plurality of cams carried by said head, said cams being movable to operative and inoperative positions, means for moving said cams to operative and inoperative positions respectively, sets of circumferentially spaced members adapted respectively to engage said cams, each set having a different spacing of the members thereof, one of said sets being adapted to engage a cam moved to operative position and means for rotating said head whereby said head and tool are moved toward said grinding means as each member of said set engages its cam.

2. A device for forming radial clearance on a tool of the fluted type adapted to be used with a grinding means having in combination, a rotatable head, means on said head for holding said tool, a stationary member adjacent which said head rotates, a plurality of radially spaced cams on said head, means for moving said cams to inoperative position, means for selectively moving one of said cams to operative position, a plurality of radially spaced series of circumferentially spaced members carried by said stationary member, one of said series being adapted to engage said cam moved to operative position and means for rotating said head whereby said head and tool are moved toward said grinding means as each member of said series engages said cam and means for retracting said head when none of said members are in engagement with said cam.

3. A device for forming radial clearance on a tool of the fluted type adapted to be used with a grinding means having in combination, a rotatable head, a stationary member adjacent said head, a plurality of radially spaced circumferentially extending cams on said head, resilient means acting on each of said cams for moving the same to inoperative position, a plurality of series of circumferentially spaced members carried by said stationary member adapted respectively to engage said cams, the members in each of said series being differently spaced, means for selectively moving one of said cams to operative position, means for rotating said head whereby said head and tool are moved toward said grinding means each time one of said members of said series engages said cam and means for retracting said head and tool when none of said members are in engagement with said cam.

4. A device for forming radial clearance on a tool of the fluted type adapted to be used with a grinding means having in combination, a rotatable head, a stationary member adjacent said head, a series of radially spaced cams pivotally connected intermediate their ends to said head, means at one end of each cam tending to move the same to inoperative position, means movable into alignment with any one of said cams for moving the same to operative position, a plurality of series of circumferentially spaced members, said series being aligned with said cams respectively, means for rotating said head whereby said head and tool are moved toward said grinding means as each member of the series in alignment with the cam in operative position engages the same and means for retracting said head when none of said members is in engagement with said cam.

5. A device for forming radial clearance on a tool of the fluted type adapted to be used with a grinding means having in combination, a rotatable head, a plurality of movable cams carried by said head, means acting on said cams and moving them to and holding them normally in inoperative position, members aligned with each of said cams respectively for moving the same to operative position and a movable member adapted to align with any one of said last mentioned members for moving the same and its respective cam.

6. The structure set forth in claim 5, said movable member comprising a lever having one end swingable to align with any one of said first mentioned members.

7. The structure set forth in claim 5, said movable member comprising an oscillating lever, one end of which is adapted to be aligned with any one of said first mentioned members and the other end of which has means for variably swinging said lever.

8. A device for forming radial clearance on a tool of the fluted type adapted to be used with a grinding means having in combination, a rotatable head, a plurality of cams carried by said head, means acting on said cams and moving them to and holding them normally in inoperative position, a member aligned with each cam for moving the same to operative position, a lever pivoted at the outer side of said head having an end adapted to be brought into alignment with any one of said members, a screw extending through the other end of said lever and adapted to engage said head and be rotated to variably move said lever to move said one of said first mentioned members and its respective cam.

9. A device for forming radial clearance on a tool of the fluted type adapted to be used with a grinding means having in combination, a head, means on said head for holding said tool, means for rotating said head, a plurality of cams adjacent said head spaced radially of said head and adapted to be used respectively with tools having different numbers of flutes and circumferentially spaced means carried by said head disposed to engage said cams respectively when in operative position for moving said head and tool progressively toward said grinding means, means manipulatable by the operator for moving one of said cams into operative position and means for retracting said head when none of said means are in engagement with said cams respectively.

WILLIAM M. POLSON.